United States Patent [19]
Shen et al.

[11] Patent Number: 5,197,133
[45] Date of Patent: Mar. 23, 1993

[54] CONTROL STORE ADDRESSING FROM MULTIPLE SOURCES

[75] Inventors: Jian-Kuo Shen, Belmont, Mass.; Richard P. Kelly, Nashua; Robert V. Ledoux, Litchfield, both of N.H.; Deborah K. Staplin, Chelmsford, Mass.

[73] Assignee: Bull HN Information Systems Inc., Billerica, Mass.

[21] Appl. No.: 286,578

[22] Filed: Dec. 19, 1988

[51] Int. Cl.$^5$ .............. G06F 9/22; G06F 9/38
[52] U.S. Cl. .............. 395/375; DIG. 1/231.8; DIG. 1/243.44; DIG. 1/262.8; DIG. 1/263; DIG. 1/264.6
[58] Field of Search ... 364/200 MS File, 900 MS File

[56] References Cited

U.S. PATENT DOCUMENTS

| | | | |
|---|---|---|---|
| 4,750,112 | 6/1988 | Jones et al. | 364/200 |
| 4,811,215 | 3/1989 | Smith | 364/200 |
| 4,875,160 | 10/1989 | Brown, III | 364/200 |
| 4,982,402 | 1/1991 | Beaven et al. | 364/200 |
| 4,985,825 | 1/1991 | Webb, Jr. et al. | 364/200 |

Primary Examiner—Gareth D. Shaw
Assistant Examiner—John C. Loomis
Attorney, Agent, or Firm—George Grayson; John S. Solakian

[57] ABSTRACT

The decoding of certain instructions cause an instruction unit of a production line data processing system to stall. Instructions still in the production line are executed, but no new instructions are sent into the production line until the instruction that caused the stall condition is executed. The execution of the instruction that caused the stall is completed by an execution unit taking over control of an address unit.

8 Claims, 6 Drawing Sheets

| STAGES | 1 | 2 | 3 | 4 | 5 | 6 | 7 | 8 | 9 |
|---|---|---|---|---|---|---|---|---|---|
| I FETCH | LDR1 LOAD INSTRUCTION FROM I-CACHE TO STRING BUFFER | MTN R2 1001 0000 0000 0000 MTN FROM I-CACHE TO STRING BUFFER | BRANCH PIPE LINE STALL I-FETCH CONTINUES UNTIL STRING BUFFERS FULL | | | | | | BRANCH |
| I CRACK | | LDR1 DECODE AND SEND INSTRUCTION TO A AND E-FIFO IN E | MTN R2 MTN TO A & I-FIFO | I-STALL I UNIT SWITCHES ADDRESS CONTROL TO E CONTROL STORE | | | | | |
| A UNIT | | | LDR1 SEND VIRTUAL ADDRESS TO VMMU (SPECIFIED BY ADDRESS SYLLABLE) | MTN R2 VIRTUAL ADDRESS TO VMMU (SPECIFIED BY CONTENTS OF R2) | SEL-E | | | MTN R2 NI VALID IN A REG FILE TRANSFER NI TO I-UNIT USING M-LD MICRO ROM(A)(54-63) | |
| VMMU | | | | LDR1 TRANSLATE VA SEND PHYSICAL ADDRESS TO E-CACHE | MTN R2 TRANSLATE VA SEND PA TO E-CACHE | | | | |
| E-CACHE | | | | | LDR1 READ OUT OPERAND AND STORE IN D-FIFO | MTN R2 READ OUT OPERAND AND STORE IN D-FIFO | | | |
| E UNIT | | | | | | LDR1 EXECUTE BY STORING OPERAND IN B1 | MTN R2 UPDATE NI IN E REG FILE TRANSFER TO A REG FILE AT END OF CYCLE | MTN R2 E-DONE (ROM(E)62) | |

CYCLES

CONTROL STORE ADDRESSING FROM MULTIPLE SOURCES

RELATED APPLICATIONS

The following United States Patent Applications are related applications to the instant application and are filed on an even date herewith.

1. The patent application of Ming-Tzer Miu and Thomas F. Joyce entitled, "Production Line Method and Apparatus for High Performance Instruction Execution," filed on Dec. 19, 1988, Ser. No. 07/286,580, which is assigned to the same assignee as this patent application.

2. The patent application of Richard P. Kelly, Jian-Kou Shen, Robert V. Ledoux, and Chester M. Nibby entitled, "Control Store Double Pump Operation," filed on Dec. 19, 1988, Ser. No. 07/286,581, which is assigned to the same assignee as this patent application.

3. The patent application of Richard P. Kelly, and Robert V. Ledoux entitled, "Control Store Address Generator for Developing Unique Instruction Execution Starting Address," filed on Dec. 19, 1988, Ser. No. 07/286,582, which is assigned to the same assignee as this patent application.

4. The patent application of David E. Cushing, Romeo Kharileh, Jian-Kou Shen and Ming-Tzer Miu entitled, "A Dual Port Read/Write Register File Memory," filed on Dec. 19, 1988, Ser. No. 07/286,552, which is assigned to the same assignee as this patent application.

5. The patent application of David E. Cushing, Romeo Kharileh, Robert V. Ledoux and Jian-Kou Shen entitled, "A Mechanism for Automatically Updating Multiple Unit Register File Memories," filed on Dec. 19, 1988, Ser. No. 07/286,551, which is assigned to the same assignee as this patent application.

BACKGROUND OF THE INVENTION

1. FIELD OF USE

This invention relates to data processing systems and More particularly to a pipeline system in which subsequent stages in the pipeline control previous stages.

2. DESCRIPTION OF THE PRIOR ART

It is well known that data processing systems include a memory for storing instructions and operands, and a processing unit for executing the instructions. The processing unit fetches the instructions from memory, generates an operand address and fetches the operand or operands from memory. The processing unit then executes the instruction and stores the resulting operand or operands back into memory at a specified location. The processing unit then fetches the next instruction.

Serial operation, particularly the need to access memory often, was a limitation on system throughput. Accordingly, caches were added to the system to improve performance. Initially, the cache stored both instructions and operands, but later designs included an instruction cache and a data cache.

About the same time, the data processing designs were implemented in a pipeline operation. Whereas, heretofore instructions were executed serially, that is the next instruction was fetched only after the execution of the previous instruction was completed, in new designs the instruction execution was pipelined. In the pipeline operation, the system is organized into number of stages, such as an instruction stage in which the instruction is fetched and analyzed, an address stage in which the operand address is developed, a memory or cache stage in which the operand is fetched, and an execution stage in which the instruction is completed. The instructions are placed serially into the pipeline. As soon as the instruction operation is completed in the instruction stage, the instruction is passed on to the address stage and the next instruction to be executed is fetched. Therefore, in the four stage system described, different portions of four instructions could be executed at the same time.

However, certain instructions have a long execution time or require intervention by another program before the instruction may be executed. These instructions cause the instruction stage to stall the pipeline until the execution of the instruction is completed. The instruction stage will then restart the pipeline. This approach requires extensive additional logic in the instruction stage with its subsequent reduction in throughput to analyze each instruction.

Accordingly, it is a primary object of the present inventor to provide a low cost high performance production line system.

It is yet another object of the present invention to provide less complex apparatus for restarting a stalled pipeline.

It is another object of the invention to provide means for a subsequent stage of the production line system to control an earlier stage to complete the execution of the instruction thereby enabling the production line to restart.

SUMMARY OF THE INVENTION

The above and other objects are achieved by the present invention in a preferred embodiment of a processing unit which is organized as a production line system and includes a number of units, each preparing a different operation on each instruction going down the production line.

An instruction unit fetches the instruction from memory and decodes it. During normal operation, an instruction unit sends certain instructions to an address unit and an execution unit. The address unit generates a memory address of an operand which is stored in memory. The operand is sent to the execution unit which executes the instruction.

The decoding of certain other instructions cause the instruction unit to stall the production line. Instructions still in the production line are executed but no new instructions are sent into the production line until the instruction that caused the stall condition is executed. The execution of the instruction that caused the stall is completed by the execution unit taking over control of the address unit.

The instruction unit generates a signal which is timed to switch a control store address multiplexer. The address multiplexer normally applies a control store address from the instruction unit to the address unit control store but in the case of the stall operation, the address multiplexer applies the control store address from the execution unit to the address unit control store. This permits the address unit to be controlled by the execution unit to complete the execution of the instruction. The completion of the instruction is signaled by the execution unit control store sending a done signal to the instruction unit. Upon reception of the signal the instruction unit will restart the production line.

BRIEF DESCRIPTION OF THE DRAWINGS

FIG. 4 shows a sequence of the instructions being processed and includes the sequence that restarts the production pipeline.

DESCRIPTION OF THE PREFERRED EMBODIMENT

Figure 1:
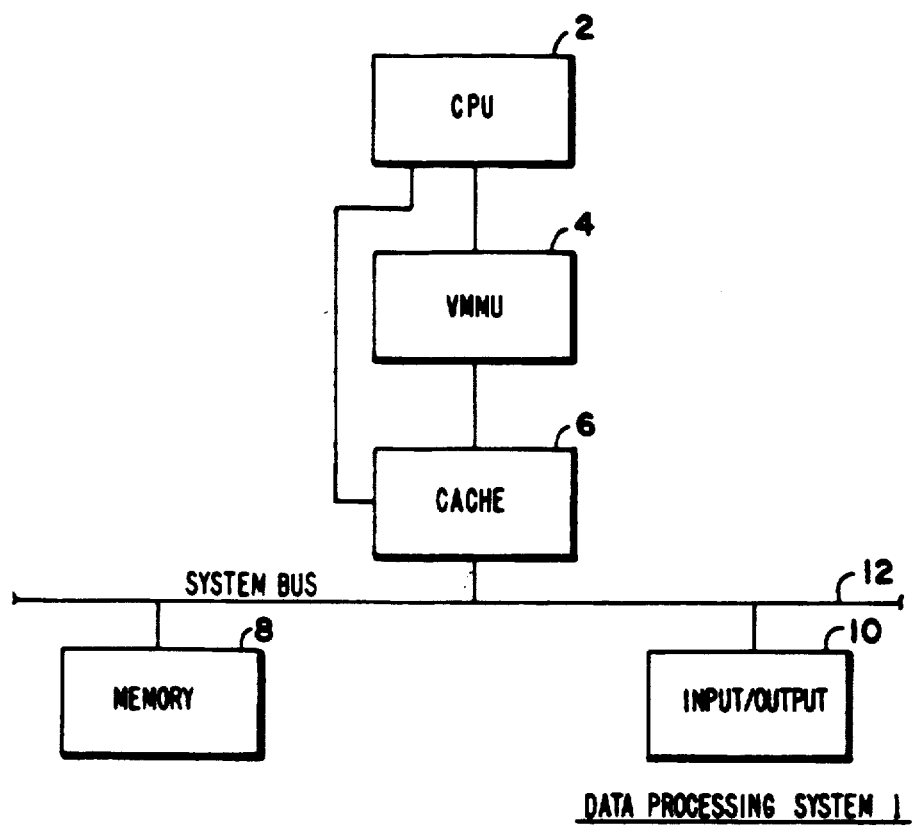
FIG. 1 is a block diagram of the overall system which includes the apparatus of the present invention.

FIG. 1 shows a block diagram of a production pipeline data processing system 1. Included are a central processing unit (CPU) 2, a virtual memory management unit (VMMU) 4, a cache unit 6, a memory subsystem 8, and input/output peripheral unit 10. The cache unit 6, memory unit 8, and input/output peripheral unit 10 are all coupled in common to a system bus 12. The memory 8 stores instructions and operands. Those operands and instructions, having the highest probability of being executed immediately, are transferred to cache unit 6 from the memory subsystem 8.

The CPU 2 receives instructions from the cache unit 6 and in the execution of these instructions sends the virtual address portion of the instruction to VMMU 4. The VMMU 4 translates the virtual address into a physical address which are applied to cache unit 6 for fetching the necessary operands to allow the CPU 2 to execute the instructions.

The input/output unit 10 represents typically any number of peripheral controllers with their devices, or an input/output processor which controls peripheral controllers and devices, or the unit 10 may represent a communications subsystem.

Figure 2:
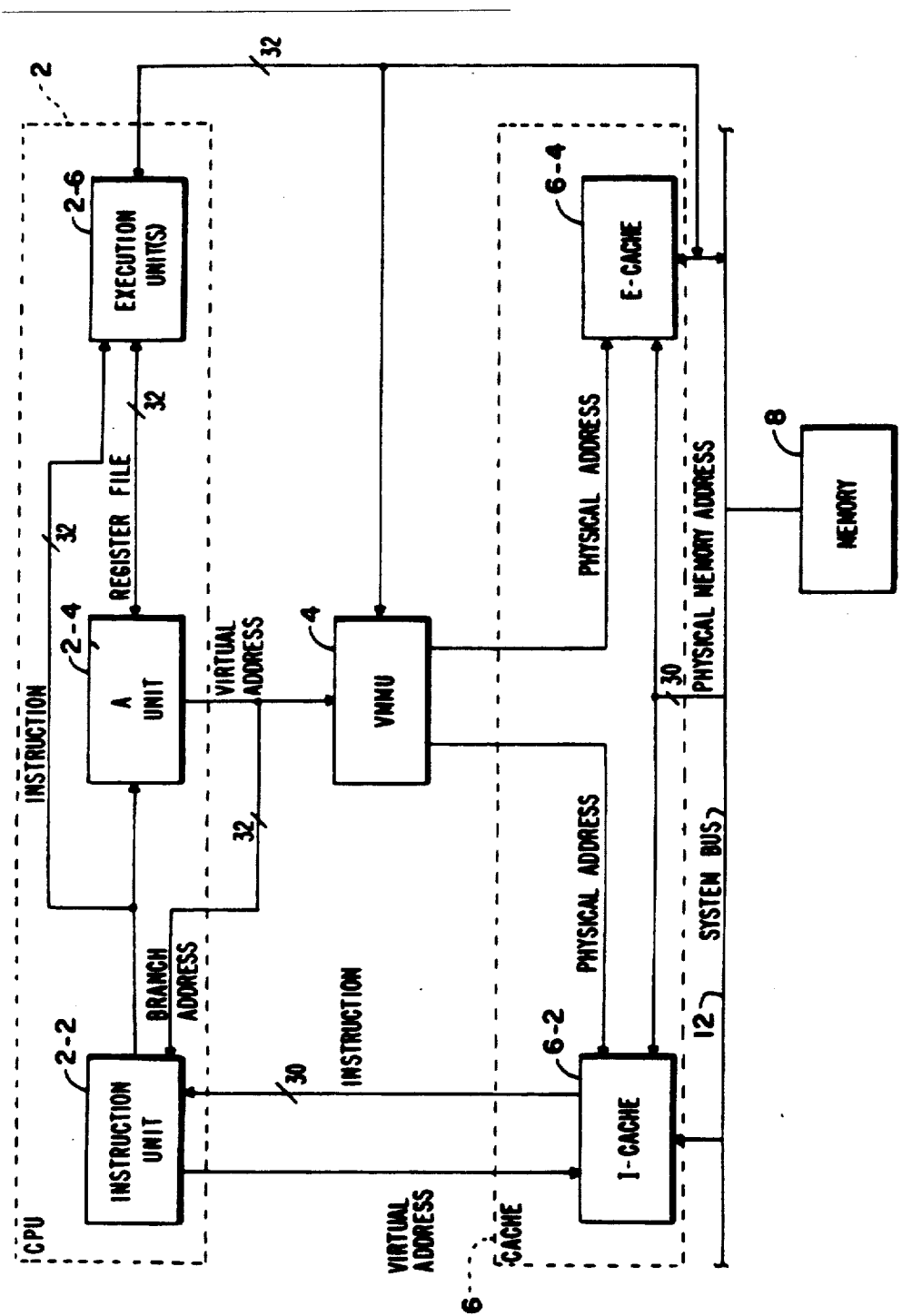
FIG. 2 is a more detailed block diagram of the overall system of FIG. 1.

FIG. 2 shows in block diagram form the major elements that make up the CPU 2 and the cache unit 6. The CPU 2 includes an instruction (I) unit 2-2, an A unit 2-4, and a number of execution (E) units 2-6. The execution units 2-6 could be a scientific instruction processor or a commercial instruction processor. However, for simplicity of description, only the operation of one of the execution units 2-6 is described which is sufficient to understand the invention.

The cache unit 6 includes an I-cache 6-2 and an E-cache 6-4. The I-cache 6-2 stores the instructions that are to be executed and the E-cache 6-4 stores the operands upon which the instructions operate. The I-unit 2-2 performs essentially two functions. It prefetches instructions from I-cache 6-2 and then cracks those instructions to determine how the other units, namely the A unit 2-4 and the E unit 2-6, will further process the instruction. In addition the I-unit 2-2 executes certain branch instructions which are then removed from the production line.

The A unit 2-4 receives the instruction from the I-unit 2-2 and executes the instruction if it is a register-to-register instruction. When the instruction is to be executed by the E unit 2-6, the A unit 2-4 sends a virtual address to the VMMU 4 which translates it into a physical address for the E-cache unit 6-4. E-cache 6-4 sends the operands to the E unit 2-6 for the completion of the execution of the instruction originally received by the instruction unit 2-2 from the I-cache unit 6-2.

The A unit 2-4 will also confirm the execution of a branch instruction and send the branch address back to the instruction unit 2-2 which has already requested the next instruction at the location in I-cache 6-2 specified by the I unit 2-2 pre-fetch branch address. Both the A unit 2-4 and the E unit 2-6 include register files which store the contents of the registers which are accessible to the programmers, that is, so called software visible registers. Both the I-cache 6-2 and the E-cache 6-4 are coupled to system bus 12 and their contents are updated with instructions and operands received from memory 8.

Instructions are executed in a production pipeline fashion by the elements of CPU 2. That is, the I unit 2-2 receives an instruction from I-cache 6-2, cracks it, and then sends the instruction to the A unit 2-4. The A unit 2-4 either executes the instruction or sends the virtual address to the VMMU 4 for translation in order to address the E-cache 6-4. E-cache 6-4 sends the designated operands to the E unit 2-6.

While the A unit 2-4 is executing its portion of the first instruction from the I unit 2-2, the I unit 2-2 is fetching the second instruction and subsequent instructions from I-cache 6-2. When the A unit 2-4 sends the virtual address specified by the first instruction to the VMMU 4 and notifies the I unit 2-2 of that event, the I unit 2-2 sends, the second instruction to the A unit 2-4. The VMMU 4 addresses the E-cache 6-4 while the A unit 2-4 is processing the second instruction in the pipeline. When the E unit 2-6 is executing the first instruction, the VMMU 4 may be addressing E-cache to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions progressing down the production line.

However, since the I unit 2-2 can execute certain branch instructions, and the A unit 2-4 can execute certain software visible register instructions, they are removed from the production line as soon as the execution of those instructions is completed. Similarly, when the A unit 2-4 is processing a branch instruction and the conditions of the branch are met, the A unit 2-4 immediately confirms the branch address of the I unit 2-2 and that branch instruction will be removed from the production line. This mode and method of operation results in increased throughput as compared to the prior art.

Figure 3:
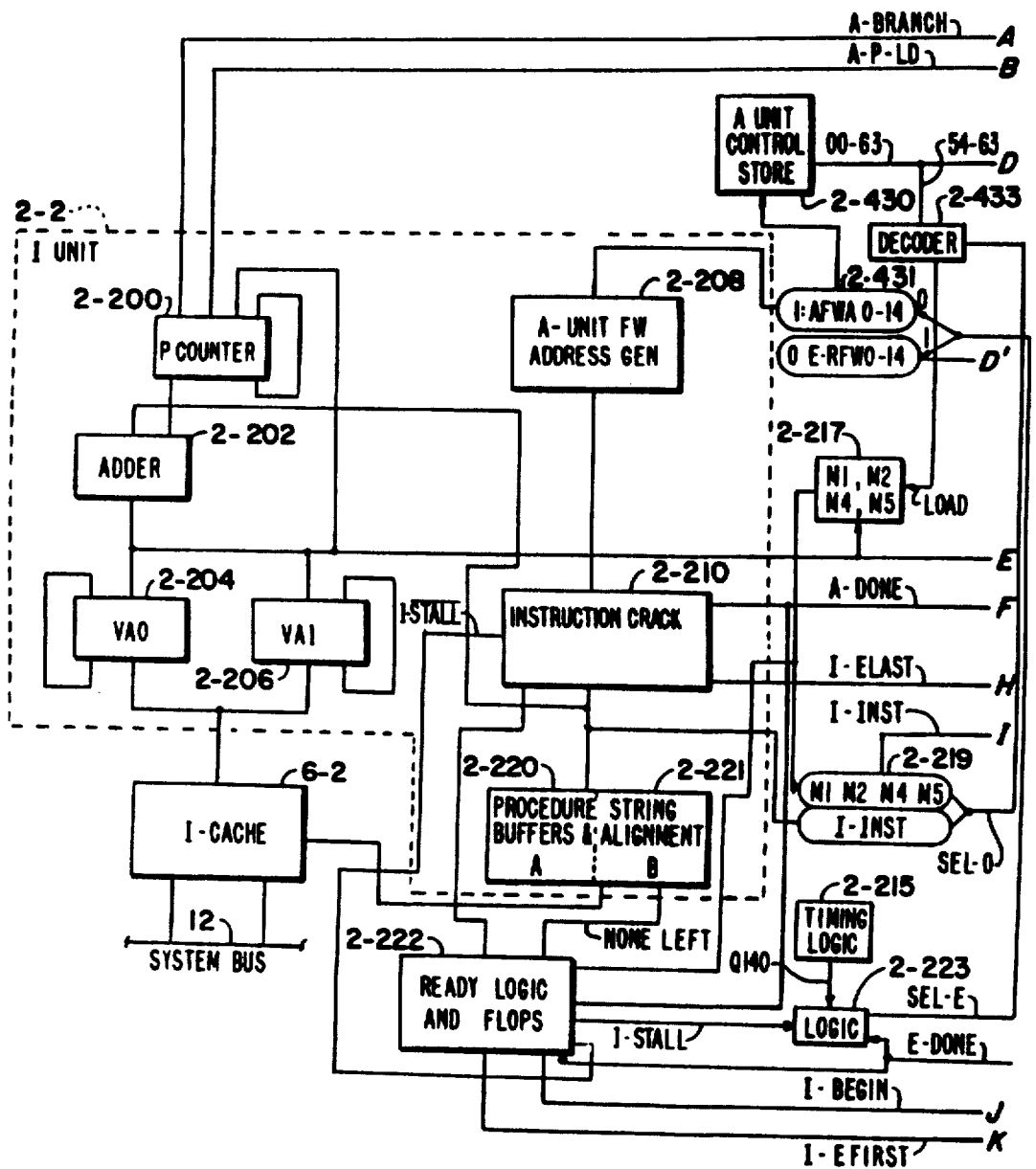
FIG. 3 is a logic block diagram of major elements of the production pipeline cycles.
Figure 3:
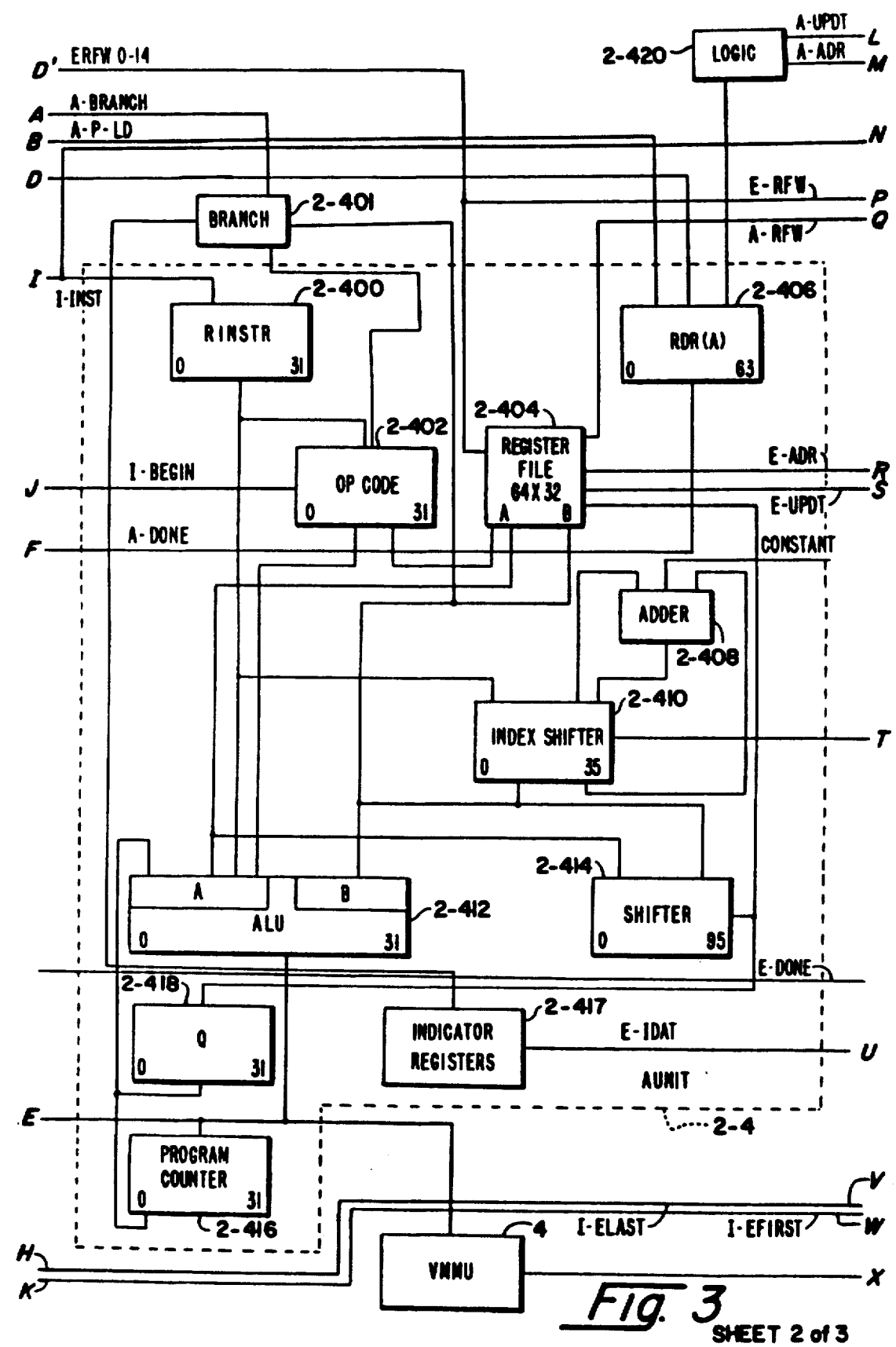
Figure 3:
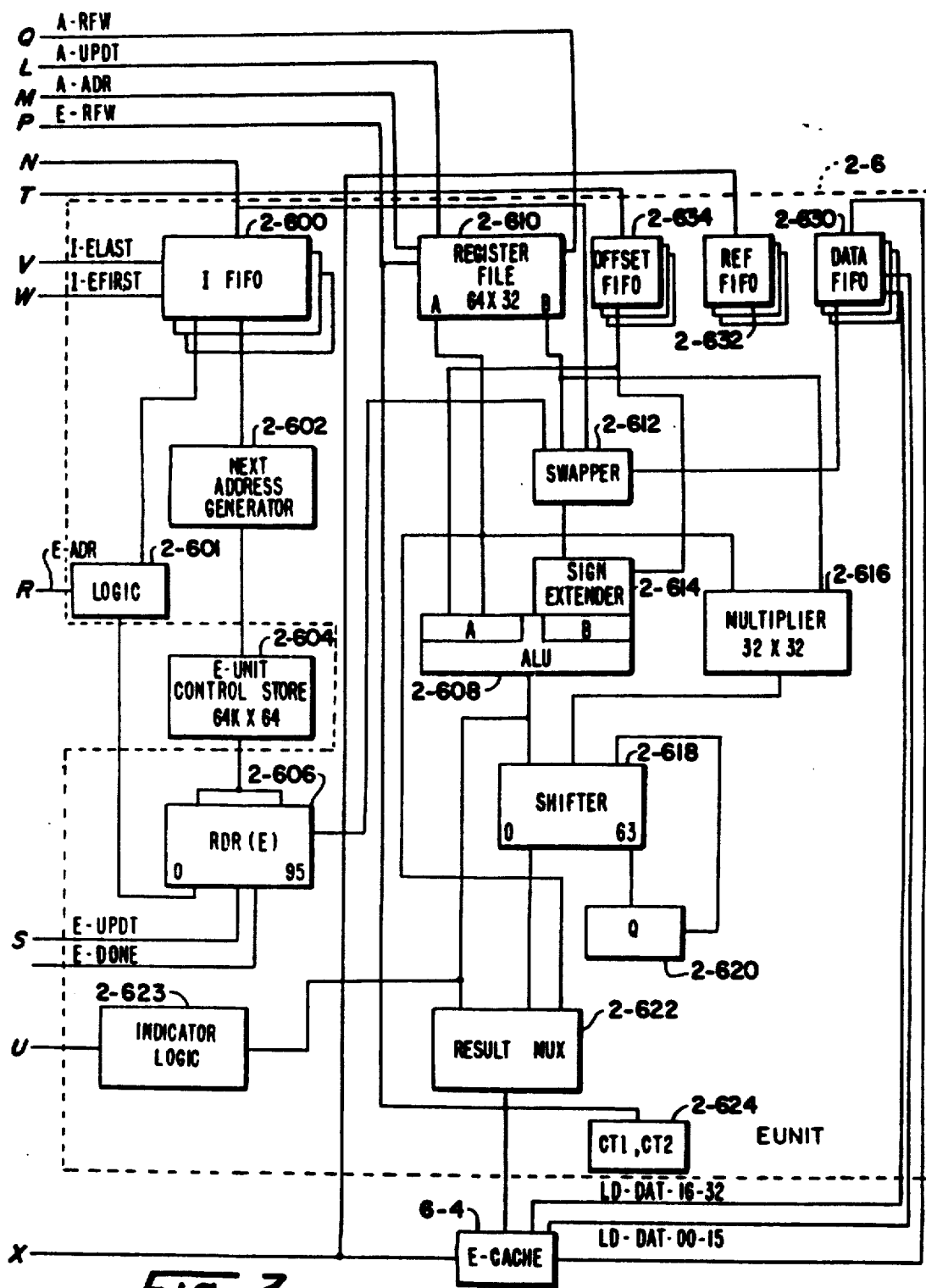

FIG. 3 shows in greater detail the elements of the instruction unit 2-2, the A unit 2-4, the execution unit 2-6 and their respective interconnections. The P-counter 2-200 of the instruction unit 2-2 is loaded by the A unit 2-4 with a virtual address. This virtual address is the address in I-cache 6-2 of the location of the next instruction that is to be placed into the pipeline. During the I-FETCH cycle, the virtual address is transferred to I-cache 6-2 via an adder 2-202 and either a register VA0 2-204 or a register VA1 2-206. Either register VA0 2-204 or register VA1 2-206 is used until a branch instruction is fetched. Then, if register VA0 2-204 is active, the address called for by the branch instruction would be stored in register VA1 2-206.

The reason the branch address is held separately in the P counter 2-200 and the program counter 2-416 registers is because if it is a conditional branch, the condition may or may not be met. If the condition is not met, then no branch will result. This gives the system the choice of either using or not using the address called for by the branch. The P counter 2-200, under firmware control, is incremented by one for one word instruction, incremented by two for a double word instruction, or replaced by a branch address from the A unit 2-4.

The instruction is read out of I-cache 6-2 into either string buffers A 2-220 or string buffers B 2-221. Here again, one set of string buffers receives successive instructions from I-cache 6-2 until there is a branch instruction. Then the instruction following the branch instruction is stored in buffers in the other string. For example, if the string buffers A 2-220 were being used then the instruction following the branch instructions would be stored in the string buffers B 2-221. The throughput is improved by storing both sets of instructions in case the branch conditions are met and the I unit 2-4 fetches the branch string from string buffers B 2-221.

The instruction is then sent to the instruction crack logic 2-210 which determines the kind of instruction it is. That is, if this is a software visible register to register instruction, then it will be executed by the A unit 2-4 if it is a memory instruction that will be executed by the E unit 2-6.

The instruction is sent from the crack logic 2-210 to an A-unit firmware address generator 2-208 which addresses an A-unit control store 2-430. The contents of the addressed location is stored in an RDR (A) register 2-406 in the A unit 2-4.

The A unit control store 2-430 is addressed from two independent units, namely, the the I-unit 2-2 and the E-unit 2-6. During production line operation the I-unit 2-2 controls the generation of the firmware address to be applied to control store 2-430. Whenever the production line is stopped, a signal I-Stall is sent by the I-unit 2-2 into logic 2-223 to generate signal SEL-E. When this occurs the current firmware which is being generated by the E-unit control store 2-604 also addresses the A-unit control store 2-430. The production line remains stalled until a restart signal, E-DONE is issued. The I-unit 2-2 generates hexadecimal addresses 8000 through FFFF by signals AFWA (0-14) with the high order bit set at logical one. The E-unit 2-6 generates hexadecimal addresses 0000 through 7FFF by signals E-RFW (0-14) with the high order bit set to logic zero.

The instruction signals I INSTR 0-31 from the string buffers 2-220 or 2-221 are transferred to the instruction (RINSTR) register 2-400 in the A-unit 2-4. If the instruction is to be executed by the E unit 2-6 it is also stored in an instruction first in a first out register (FIFO) 2-600 in the E unit 2-6. The instruction is also stored in an OP-CODE register 2-402 in the A unit 2-4 under control of a signal I-BEGIN from the I Unit 2-4. Both the RINSTR register 2-400 and the OP CODE register 2-402 store double words of 32 bits each. If an instruction requires 2 or 3 double words, then the OP CODE for that instruction remains in the OP CODE register 2-402 while each of the double words of the instruction in turn are stored in the instruction register 2-400.

The output of the OP CODE register 2-402 is used primarily for addressing a register file 2-404 under control of OP CODE and firmware bits stored in the OP CODE register 2-402 and the register RDR (A) 2-406 respectively. The register file 2-404 includes the software visible registers. If the instruction being executed is a memory instruction, then a virtual address is generated and sent to the VMMU 4 via an arithmetic logic unit (ALU) 2-412. Depending upon the instruction being executed by the A unit 2-6, the input to the ALU 2-412 may be applied to the A side, by the RINSTR register 2-400, the OP CODE register 2-402, the register file 2-404 or a program counter 2-416. ALU 2-412 B side inputs are provided by an index shifter 2-410 for index or offset operations, via an adder 2-408 or from register file 2-404. If this is a register instruction, for example, a shift operation of the contents of a software visible register in the register file 2-404, then the output of the register file 2-404 may be applied to the shifter 2-414, be shifted the number of bits specified by the instruction and stored back in the register file 2-404 in the same register from which it was read.

Indicator registers 2-412 contain the program status indicators for certain instructions including branch instructions. The register bits include an overflow indicator (or), a carry indicator (C) of the latest operation designated to offset this bit, a bit test indicator (B) representing the status of the last bit tested and an input/output indicator (I) representing the status of the last peripheral interrogate. Also include are indicators greater than (G), less than (L) and unlike signs (U) representing the results of the latest compare.

Similar indicator bits are used for scientific and commercial instructions.

Conditioned branch instructions will therefore test an indicator bit and branch if the condition is true. Other conditioned branch instructions will test the condition of selected software visible registers in the register files 2-404 and 2-610. The OP code of the branch instruction will specify the true status of the selected software visible register, namely it is less than ZERO, greater than ZERO, equal to ZERO, not equal to ZERO, less, non or equal to ZERO, odd, or even.

The branch instruction types include short displacements of up to 16 bits, a big displacements of 30 bits. The branch instruction may be an unconditional branch type or a conditional branch type. The I unit 2-2 will generate the branch address for all short displacement branch instructions. It does this by adding the contents of the displacement field which is in the string buffers 2-220 or 2-221 to the contents of the P counter 2-200 by means of the adder 2-202.

The branch stream is read from I Cache 6-2 into the string buffers 2-220 or 2-221.

If the branch instruction specifies an unconditional branch then the I unit 2-2 executes the branch instruction and begins cracking the next instruction in the branch instruction stream.

If the branch instruction is a conditional branch instruction then the I unit 2-2 waits for the A unit 2-4 to make the decision on which instruction stream the I unit 2-2 will crack. Signals from OP code 2-402, register file 2-404 and the indicator register 2-417 are applied to branch logic 2-401. RDR(A) 2-406 generates signal A-P-LD then the branch address signals from the ALU 2-412 are loaded into the P counter 2-200 and Branch Logic 2-401 generates from bit positions 46–50 or hexadecimal 07. Signals A-BRANCH and A-P-LD are applied to P COUNTER 2-200, the A-BRANCH signal is generated from OP CODE register signals specifying the kind of branch, the status of specified indicator register 2-417 bits and the status of certain software visible registers from the register file 2-404. If both signals are true the I unit 2-2 starts cracking the instructions in the branch instruction stream. If signals A-P-LD is true and A-BRANCH is false the I unit 2-2 continues cracking the original instruction stream.

If in the I unit 2-2, the instruction calls for a branch and has a displacement, then the displacement from the crack unit 2-210 is applied to the adder 2-202 to be added to the contents of the P counter 2-200 and stored in either register VA0 2-204 or register VA1 2-206 and applied to the I-cache 6-2.

When the A unit 2-4 has completed the execution of the instruction, an A-DONE signal is sent to the crack logic 2-210 of the I unit 2-2. This informs the I unit 2-2 to send the next instruction stored in the string buffers 2-220 or 2-221 to the A unit 2-4 and if required, to the E unit 2-6. If an instruction calls for execution by the E unit 2-6, then the I unit 2-2 sends that instruction to the instruction FIFO 2-600 under control of signal I-E-LAST and signal I-E-FIRST. These signals control the loading of the instruction FIFO 2-600.

For the conditional branch instruction, signals from RINSTR 2-400 and from the ALU 2-412 are applied to branch logic 2-401. The output, load signal A-P-LD, enables the P counter 2-200 to accept the branch address signals A-BRANCH which are sent to I-CACHE 6-2.

When the A unit 2-4 has completed the execution of the instruction, an A-DONE signal is sent to the crack logic 2-210 of the I unit 2-2. This informs the I unit 2-2 to send the next instruction stored in the string buffers 2-220 or 2-221 to the A unit 2-4 and if required, to the E unit 2-6. If an instruction calls for execution by the E unit 2-6, then the I unit 2-2 sends that instruction to the instruction FIFO 2-600 under control of signal I-E-LAST and signal I-E-FIRST. These signals control the loading of the instruction FIFO 2-600.

The boolean expressions describing the signals appear in the appendix and should be referenced where appropriate. The I-BEGIN signal is received by the A unit 2-4 when the CRACK signal is generated, the system is not in a hold mode and no logic block including the clock logic is in a stall mode.

The CRACK signal is generated when the ready logic and flops 2-222 is ready to crack the instruction, the string buffers A 2-220 or string buffers B 2-221 store at least one instruction, and the A unit 2-4 had generated the ADONE signal indicating that the A unit is available for processing the next instruction.

The I unit 2-2 generates the I-EFIRST and the I-ELAST signals by the ready logic and flops 2-222 if the instruction being cracked is to be executed by the E unit 2-6. Both signals are applied to the I FIFO 2-600. The I-EFIRST signal enables the I-FIFO 2-600 to store a double word instruction. The I-ELAST signal enables the I-FIFO 2-600 to store a single word instruction.

Note that the I unit 2-2 sends the instruction to be executed in the A unit 2-4, and only to FIFO 2-600 if the instruction is to be executed in the E unit 2-6. In the E unit 2-6, the next instruction the FIFO 2-600 will execute is applied to the next address generator 2-602 which generates the E unit control store 2-604 address location. The firmware word is stored in a register RDR (E) 2-606. The instruction FIFO 2-600 stores up to four instructions.

When the A unit 2-4 sends its virtual address to the VMMU 4, the VMMU 4 generates the physical address which addresses the E-cache 6-4. The contents of the addressed location is stored in a data FIFO 2-630 in the E unit 2-6 by signal LD-DAT-0015 and LD-DAT-1631 for a single word transfer or for a double word transfer. Signal LD-DAT-0015 also increments by one the FIFO 2-630 write address to accept the next transfer. This data is the operands on which the instruction will operate. The E-unit 2-6 executes instructions whose operands are stored in software visible registers of register file 2-630. A typical instruction is the multiply instruction.

During the execution of an instruction by E unit 2-6, the indicator status maybe changed by indicator logic 2-623 generating signals E-IDAT 0-8 from signals received from the ALU2-608. Signals E-IDAT 0-8 update the indicator registers 2-417 in the A unit 2-4.

For certain instructions, that are executed by the E unit 2-6 that do not require operands, the A unit 2-4 generates a dummy cycle by sending the virtual address, hexadecimal 40, to the VMMU 4. This results in the E-CACHE 6-4 generating a dummy cycle by sending signals signal LD-DAT 1631 to the FIFO 2-630 with a "dummy" operand.

If in the I unit 2-2, the instruction calls for a branch and has a displacement, then the displacement from the crack unit 2-210 is applied to the adder 2-202 to be added to the contents of the P counter 2-200 and stored in either register VA0 2-204 or register VA1 2-206 and applied to the I-cache 6-2.

Certain instructions, typically those that require outside intervention, result in the I unit 2-6 generating a I-STALL signal. The I-STALL signal inhibits the I-BEGIN, I-EFIRST and I-ELAST signals during subsequent cycles. This stalls the production line and the last instruction in the production line, that is, the instruction that caused the stall, is executed and subsequent instructions that were fetched from the I-Cache 6-2 are not sent into the production line until that last instructions is executed. A typical instruction that stalls the production line is the Modify or Test Register M (MTM) instruction.

The I-STALL signal is applied to logic 2-223 which generates a SEL-E signal which switches MUX 2-431 to receive the E-RFW 0-14 signals from the E unit 2-6. Signal SEL-E is generated at the start of the following cycle by timing signal Q140. Each cycle starts on the rise of cyclic timing signal Q140. Timing signal Q140 is generated by timing logic 2-217 in a conventional manner.

For the MTM instruction, signals E-RFW 0-14 from the next address generator 2-602 address the A unit control store 2-430 through MUX 2-431. Firmware signals 54-63 are decoded in a decoder 2-433 to generate a LOAD signal which loads the M register 2-217 with the output signals from ALU 2-412 of the A unit 2-4.

The contents of the M register 2-217 are read out onto signal lines I-INST via MUX 2-219 to register RINSTR 2-400 and I FIFO 2-600. The contents of the M-registers in the I-unit 2-2 are used to stop the production line if the instruction being executed can cause a trap.

The production line is restarted when the E unit 2-6 generates the E-DONE signal from RDR (E) 2-606 indicating the execution of the instruction is completed. The E-DONE signal is applied to the logic 2-223 and the flops 2-222 to reset the I-STALL and SEL-E signals. The I unit 2-2 then sends the next instruction into the production line by generating the I-BEGIN, I-EFIRST and I-ELAST signals as before.

A multiplier 2-616 is coupled to the A & B ports of register file 2-610 to generate and store partial products in conjunction with the shifter 2-618 and the Q-register 2-620. The partial products are applied to a result multiplexer (MUX) 2-622 and stored in accumulator location in register file 2-610. When the multiplication is completed the final result is stored in one of the software visible registers of register file 2-610.

A swapper logic 2-612 receives operands from the B side of register file 2-610 for swapping words within double words and swapping bytes within single words. A 16-bit word is made up of two 8-bit bytes. A double word is made up of two 16-bit single words or four 8-bit bytes. A sign extender 2-614 repeats the sign of all the high order positions of a double word to the left of the first significant bit of the double word.

The CT1 and CT2 counters 2-624 are used in the calculation of the exponent of a floating point resultant. A mantissa of a floating point operand is processed through the ALU 2-608 and a shifter 2-618. These are performed in a conventional manner.

The software visible registers in both the register files 2-404 with A unit 2-4 and 2-610 in the E unit 2-6 are updated on successive cycles so that they both contain the same information. This is accomplished by firmware signals from register RDR (A) 2-406 which are applied to logic 2-420 to generate an update signal A-UPDT which enables the register file 2-610 and six A-ADR signals which are applied to the address terminals of register file 2-610 to store the data from the D terminal of the register file 2-404 to the D terminal of register file 2-610. Similarly, the E-UPDT signal from register RDR (E) 2-606 enable register file 2-404 to store the data at the address specified by signals E-ADR from logic 2-601. Logic 2-601 generator signals E-ADR from instruction signals from the instruction FIFO 2-600 and firmware signals from RDR (E) 2-606.

The A unit 2-4 program counter 2-416 stores the address of the next instruction. P counter 2-200 in the I unit 2-2 also stores the address of the next instruction. The reason for the two registers is that, in case of a conditional branch, P counter 2-200 in the I unit 2-2 stores the branch address in case it is to be used, whereas the program counter 2-416 will not store the branch address but stores the next address in the sequence presently being executed.

FIG. 4 shows an example of the invention wherein the E unit 2-6 addresses the A unit control store 2-430 to enable both the A and E units to complete the execution of the MTM instruction.

The operations generally performed by the stages are as follows. The I-FETCH stage sends a sequence of addresses of instructions to the I-Cache 6-2. The addressed locations in the I-Cache 6-2 are read out and stored in string buffers 2-200 or 2-221.

The I-CRACK stage decodes each instruction stored in the string buffers 2-220 or 2-221 in turn and generates the I-BEGIN signal to load the instruction into the R INSTR 2-400 register the A unit 2-6 and generates signals I-EFIRST and E-LAST to load the instruction into the instruction FIFO 2-600 if the E unit 2-6 will execute the instruction. The I-CRACK stage also generates the address of the location in the A unit control store 2-430 which contains the firmware which controls the A unit 2-4. The A stage executes register instructions or generates a virtual address for memory instructions. The VMMU stage translates the virtual address to a physical address.

The E-Cache stage reads out the operand from the location specified by the physical address and stores it in the data FIFO 2-630.

The E stage executes the instruction.

Referring to FIG. 4, the Load B1 instruction is the first instruction going down the production line. The B1 register appears in both register files 2-404 and 2-604 and is software visible. The Load B1 instruction includes information specifying the virtual address of the operand in E-Cache 6-4 which is loaded into the B1 registers in register files 2-404 and 2-610.

During cycle 1 the I FETCH stage loads the Load B1 instruction which is received from the I-Cache 6-2 into string buffers 2-220 or 2-221.

During cycle 2 the I-CRACK stage determines that the E unit 2-6 will execute this instruction and the A unit 2-4 will develop the virtual address of the operand to be loaded into software visible register B1. The instruction therefore, is loaded into FIFO's 2-404 and 2-604 and the control store address signals AFCOA 0-14 through MUX 2-431 which specify the location of the firmware to generate the virtual address is sent to the A unit control store 2-430.

The A unit 2-4 generates and sends the virtual address to the VMMU 4 during cycle 3. The VMMU 4 translates the virtual address to the physical address during cycle 4. During cycle 5, the E-Cache 6-4 sends the operand specified by the physical address to the data FIFO 2-630. The instruction is executed during cycle 6 by the E unit 2-6 by loading the operand into the B1 register in register file 2-610.

The next instruction, the Modify or Test register M1 instruction (MTM B2) is fetched from the I-Cache 6-2 by the I-FETCH stage during cycle 2 and loaded into the next string buffer 2-220 or 2-221.

The designated software visible 8 bit register M is altered and/or tested as specified by the contents of the location whose address is stored in software visible register B2. Both the M and B2 registers are in register files 2-404 and 2-610.

In this example the designated register M1 includes bit position 0 which stores a trace trap enable bit for Jump and Branch Instructions. Bit position 0 at logical ZERO disables the trace trap and at logical ONE enables the trace trap.

Bit positions 1 through 7 enable overflow traps controls for software visible registers R1 through R7 of register files 2-404 and 2-610 where a bit position of logical ZERO disables the overflow trap for that register and at logical ONE enables the overflow trap for that register.

A trap is an event that can occur during the execution of an instruction and indicates that software intervention is required. If a branch condition is true and bit position 0 is at binary ONE then a trap will occur and call for a software routine to intervene.

Similarly where arithmetic functions are performed on the contents of a designated R register and an operand, then the result is loaded into the designated R register. If the designated bit in the M1 register is at logical ONE and there is an overflow condition this software intervention is required.

In cycle 3 the I-CRACK stage decodes the MTM B2 instruction. For the MTM B2 instruction, bit positions 1 through 3 at binary 001 identify register M1 as the designated M register. Bit positions 4 through 11 at binary 00000000 designate this as an MTM instruction using the contents of a B register to point to an operand, and bit positions 12 through 15 at 0010 identify the software visible register as R2.

During cycle 3 of the I-CRACK stage, the logic 2-222 generates an I-STALL signal by decoding the OP code bit positions 4 through 8 at 00000. The I-STALL signal remains active until MTM instruction is executed and the E-DONE signal generated by the E-Unit 2-6 is received by the logic 2-222.

During cycle 4 of the I-CRACK stage, the I-STALL signal is applied to logic block 2-223 to generate the MUX select signal SEL-E which selects the E-RFW 0-14 control store address signals from the E unit 2-6.

Also, during cycle 4 the A stage sends the virtual address specified by the contents of register B2 to the VMMU4. During cycle 5 the VMMU stage translates the virtual address to a physical address and applies it to the E-Cache 6-4.

During cycle 6, the E-Cache stage reads out the operand and stores it in the data FIFO 2-630. During Cycle 7 the E stage updates the M1 register in the register file 2-610 and in the M1 register of the register file 2-404 at the end of cycle 7. Also, during cycle 7 the E stage sends to the A unit control store 2-430, address signal, E-RFW 0-14 through MUX 2-431. The M-LD MICRO firmware bits 54-63 are read from control store 2-430 and are decoded to generate the LOAD signal which is applied to register M1, M2, M4 and M5 to load the M1 information from ALU 2-412.

During cycle 8 the E stage sends the E-DONE signal, (RDR E 63) to logic 2-223 of the I unit 2-2 to reset the I-STALL signal thereby restoring the pipeline.

While the invention has been shown and described with reference to the preferred embodiment thereof, it will be understood by those skilled in the art that the above and other changes in form and detail may be made therein without departing from the spirt and scope of the invention.

APPENDIX A

The neumonics of the instructions are shown in the following document which is commercially available from Honeywell Bull Inc., Hardware Version of DPS6 Programmers Pocket Guide CU75-02 (Aug. '84). The notations in the boolean equations are as follows:

| | |
|---|---|
| EQ 0100 | EQUAL TO HEXADECIMAL 0100 |
| GT 3 | GREATER THAN HEXADECIMAL 3 |
| NEQ 2 | NOT EQUAL TO HEXADECIMAL 2 |
| NLT 018 | NOT LESS THAN HEXADECIMAL 018 |
| NGT 01E | NOT GREATER THAN HEXADECIMAL 01E |
| LT 3 | LESS THAN HEXADECIMAL 3 |

The I-BEGIN signal is generated by the boolean equation:

I-BEGIN = CRACK & ∧ I-STALL & ∧ HOLD

CRACK = READY & ∧ NONELEFT & ADONE

The ∧ signifies a negated signal, i.e. ∧ HOLD should be read as the "NOT HOLD" signal.

The boolean equation for the I-EFIRST and I-ELAST signals are:

I-EFIRST = CRACK & ∧ I-STALL & EINSTR
I-ELAST = I-EFIRST (∧ MSK + (SIZE EQ 2) + EII)
 + (∧ HOLD & MSK & ∧ EII & CRACK & ∧ I-STALL & NOTSTO
 & RSIZE EQ 2)
E-DONE = RDR (E) 62 (RDRC (E) 2-606)
I-STALL = MTM (CRACK) & ∧ I-STALL & Q140
SEL-E = I-STALL & ∧ E-DONE & Q140

The boolean equation for Signal EINSTR is generated as a function of combinations of bits of the different types of instructions that require execution by the E unit 2-6. The boolean equation is:

EINSTR = GCS + (IO + IOLD + SC + MASK + BIT4 + LB +
 LEV + INCDEC & ∧ RAS + MTM + MUL + DIV +
 STM +
 SSBP) & ∧ EII + (BSTORE + EBIM0) & IMO +
 EMSK
 & EII + MLV & (SI + ESI & EII1) +
 (ESO+EDO) &
 (∧ ERAS&(EII1 + EII23) + AS3EII45) + EEII &
 (EIII + EII23) + (SDO + SO) & ∧ RAS & IMO
 &
 ∧ EII

DESCRIPTION OF EQUATION TERMS

GENERIC, COMMERCIAL, OR SCIENTIFIC INSTRUCTIONS
GCS = I-INST (0-8) EQ O;
IO INSTRUCTION
IO = (I-INST (0-8) EQ 0100)
IOLD INSTRUCTION
IOLD = I-INST (0-8) EQ 0103
SINGLE OPERAND INSTRUCTION
SO = (I-INST (0-3) EQ 8 & ((I-INST (4-8) EQ 1) + (I-INST (4-8) GT 3))
SINGLE OPERAND INSTRUCTION THAT USES B REGISTERS IN THE E UNIT 2-6
SSBP = I-INST (0-8) EQ 0106
SINGLE OPERAND INSTRUCTIONS THAT USE OVERFLOW: (NEG, CAD, AID, SID, INC., DEC. INSTRUCTIONS)
SOV = SO & ((I-INST (4-8) EQ 4) + (I-INST (4-8) EQ 01D) + (I-INST (4-7) EQ 4)) + INCDEC
LB INSTRUCTION
LB = SO & (I-INST (4-8) EQ 05)
BIT INSTRUCTIONS (LBF, LBT, LBC, LBS)
BIT4 = (I-INST (0-5) EQ 022) & (I-INST (8) EQ 0)
BASIC DOUBLE OPERAND OR SCIENTIFIC INSTRUCTIONS
SDO = (I-INST (0-3) GT 8) & (I-INST (4-8) NEQ 2)
BASIC INSTRUCTIONS WITH IN-LINE MASK WORD: (SRM, NSAVE, NRSTR, SAVE, RSTR)
MASK = (I-INST (0) EQ 1) & (RLBP NEQ ) & (I-INST (4-8) EQ 015) + (I-INST (0-7) EQ 085) + (I-INST (0-7) EQ 08F)
SCIENTIFIC SINGLE AND DOUBLE OPERAND INSTRUCTIONS
SC = ((I-INST (0-3) GT 8) & ((I-INST (4-8) EQ 011) + (I-INST (4-8) EQ 013 + (I-INST (4-8) EQ 018) + (I-INST (4-8) EQ 01A))) & ∧ EIII & ∧ EII23 & ∧ AS3EII45
DOUBLE OPERAND INSTRUCTIONS THAT USE M REG AND DON'T STOP PIPELINE
STM = (I-INST (O) EQ 1) & (RLBP NEQ 0) & (I-INST (4-8) EQ OE)
WHERE RLBP = I-INST (1-3)
MULTIPLY INSTRUCTION
MUL = (I-INST (0) EQ 1) & (RLBP NEQ 0) & (I-INST (4-8) EQ 016)
DIVIDE INSTRUCTION
DIV = (I-INST (0) EQ 1) & (RLBP NEQ 0) & (I-INST1 (4-8) EQ 06)
MODIFY OR TEST REGISTER M INSTRUCTION
MTM = (I-INST (0-3) GT 8) & (I-INST (4-8) EQ 0)
(INSTRUCTIONS THAT STOP PIPELINE IF THEY INCLUDE AN IMMEDIATE OPERAND (IMO)NEG, SSBP, CPL, CALL, CL, CLH, LBF, DEC, LBT, LBS, INC, LBC, STS, SDI, CAD (ALSO LE) STM, STH, SRM, SWR, SWB, STR, STB, ARE SO, DO
BSTORE = SO & ((I-INST(4-8) EQ 4) + (I-INST(4-8) EQ 6) + (I-INST(4-6) EQ 3) + (I-INST(4-7) EQ 0A) + (I-INST(4-7) EQ 8) + (I-INST(4-8) EQ 018) + (I-INST(4-8) EQ 01A) + (I-INST(4-7) EQ OE)) + BIT4 + SDO & ((I-INST(5-7) EQ 7) + (I-INST(4-8) EQ 015) +

-continued (I-INST(4-6) EQ 7))
SHORT VALUE IMMEDIATE INSTRUCTION
SI = (I-INST(0).EQ.0) & (RLBP.NEQ.0) &
(I-INST(4-7).GT.0B)
IMO INSTRUCTIONS THAT USE B REG IN E UNIT 2-6
(LDB, LAB, STB, SWB)
EBIMO = (I-INST(0-3) GT 8) & ((I-INST(4-8) EQ 019) +
(I-INST(4-8) EQ 017) + (I-INST(4-8) EQ 01D) +
(I-INST(4-8) EQ 01F))
LEV INSTRUCTION
LEV = SO & (I-INST(4-8) EQ 01C)
INC AND DEC INSTRUCTIONS
INCDEC = SO & ((I-INST(48) EQ 011) + (I-INST (4-8) EQ 015))
MLV OR MLVK INSTRUCTION
MLV = I-INST(6-7) EQ 3
EXTENDED INTEGER SINGLE OPERAND INSTRUCTION
ESO = (I-INST(0-3) EQ 8) & (I-INST(4-8) NLT 018) &
(I-INST(4-8) NEQ 01B) & (I-INST(4-8) NGT 01E)
EII SO THAT USE OVERFLOW & DON'T STOP PIPELINE: KINC, KDEC, KNEG, KNEGB INSTRUCTIONS
ESOV = ESO & (I-INST(6-7) LT 3) & (I-INST(6-8) NEQ 1)
E11 SHORT VALUE IMMEDIATE INSTRUCTION
ESI = EBK & (I-INST(8) EQ 1)
EXTENDED INTEGER DOUBLE OPERAND INSTRUCTION
EDO = (I-INST(0-3) GT 8) & (I-INST(4-7) NLT 4)
EXTENDED INTEGER INSTRUCTION (EII) INSTR
WITH IN-LINE MASK DOUBLEWORD
EMSK = (I-INST(0) EQ 1) & (RLBP NEQ 0) & (I-INST(4-8) EQ OF)
WHERE RLBP = I-INST (1-3)
E11 INSTRUCTIONS EXECUTED IN E UNIT 2-6 THE
INSTRUCTION INCLUDES A REGISTER ADDRESS
SYLLABLE (RAS) OR AN (IMO) (KDIV, KMUL, KMULP, KDIVP, KSKM INSTRUCTIONS)
EEII = KDIV + KMUL + KDIVP + KMULP
KDIV = (I-INST(0) EQ 1) & (RLBP NEQ 0) & (I-INST(4-8) EQ 017)
KMUL = (I-INST(0) EQ 1) & (RLBP NEQ 0) & (I-INST(4-8) EQ 01C)
KDIVP = (I-INST(0) EQ 1) & RLBP NEQ 0) & (I-INST(4-8) EQ 01C)
KMULP = (I-INST(0) EQ 1) & (RLBP NEQ 0) & (I-INST (4-8) EQ 01E)
EIII = I-INST(9-15) EQ 06C
EII23 = I-INST(9-15) EQ 07C)
AS3EII45 = I-INST(9-15) EQ 058
RAS = (I-INST(9-11) EQ 5) & (I-INST(12) EQ 0) &
(I-INST(13-15) NEQ 0)
IMO = I-INST(9-15) EQ 070
KAS = (I-INST(23-28) EQ 01A) & NC
ERAS = (I-INST(24-28) EQ 01A) & NC
NC = I-INST (29-31) NEQ 0
II = EIII + EII23 + AS3EII45

We claim:

1. A data processing system having a plurality of series connected pipeline stages arranged to form a production line, each stage performing a different operation on each of a plurality of instructions applied to said pipeline stages, said system comprising:
    memory means for storing a plurality of instructions and operands;
    an instruction stage coupled to said memory means and having memory address generating means for fetching each of said plurality of instructions, said instruction stage having first address generating means responsive to a first type of instruction for generating first control store address signals and stalling means responsive to said first type of instruction for generating a stall signal for stalling said instruction stage of said production line and generating a select signal in a first state, and multiplexer means responsive to said select signal in a first state for selecting said second control store address signals;
    an address stage coupled to said instruction stage and having first control store means for fetching a first firmware word stored at a location specified by said first control store address signals, said address stage including first logic means responsive to signals from said first firmware word and said first type of instruction for generating an operand address;
    said memory means coupled to said address stage for reading out an operand at a location specified by said operand address;
    an execution stage coupled to said instruction stage, said address stage and said memory means and having first executing means responsive to said first type of instruction and said operand for executing a first portion of said first type of instruction, said execution stage further having second address generating means for generating second control store address signals, and said execution stage further having firmware means for generating a done signal;
    said address stage having said first control store means coupled to said multiplexer means responsive to said select signal in said first state for reading out a second firmware word at a location specified by said second control store address signals, said address stage further having second executing means responsive to signals from said second firmware word for executing a second portion of said first type of instruction; said instruction stage having said second means responsive to said done signal for restarting said instruction stage of said production line.

2. The system of claim 1 wherein said memory means comprises:
    an instruction cache for storing said plurality of instructions; and
    a operand cache for storing said operands.

3. The system of claim 2 wherein said instruction fetching means comprises:
    first register means for storing a sequence of virtual addresses for fetching the contents of each location of said each of said plurality of instructions from said instruction cache;
    second register means for storing said each of said plurality of instructions read from said plurality of instructions.

4. The system of claim 1 wherein said stalling means comprises:
    decoding means responsive to signals from said first type of instructions for generating a first signal and a second signal during a first cycle of production line operation and said stall signal during a second cycle of said production line operation thereby suppressing the further generation of said first signal and said second signal;
    timing means for generating a timing signal; and second logic means responsive to said timing signal and said stall signal for generating said select signal in said second state during a third cycle of said production line operation.

5. The system of claim 4 wherein said address stage comprises:

third register means responsive to said first signal for storing said first type of instruction; and said first logic means coupled to said third register means for generating said operand address for reading out said operand from said memory means.

6. The system of claim 5 wherein said first executing means comprises:

fourth register means responsive to said second signal for storing said first type of instruction;

next address logic means coupled to said fourth register means and responsive to said first type of instruction for generating third control store address signals;

second control store means responsive to said third control store address signals for reading out a third firmware word; and first arithmetic logic unit means responsive to said operand and signals from said third firmware word for executing said first portion of said first type of instruction.

7. The system of claim 6 wherein said firmware means comprises:

control store register means for storing said third firmware word signals received from said second control store means; and means for sending said done signal to said instruction stage.

8. The system of claim 7 wherein said second executing means comprises: second arithmetic logic unit means responsive to said second firmware word signals for executing said second portion of said first type of instructions.

* * * * *